Patented Feb. 24, 1953

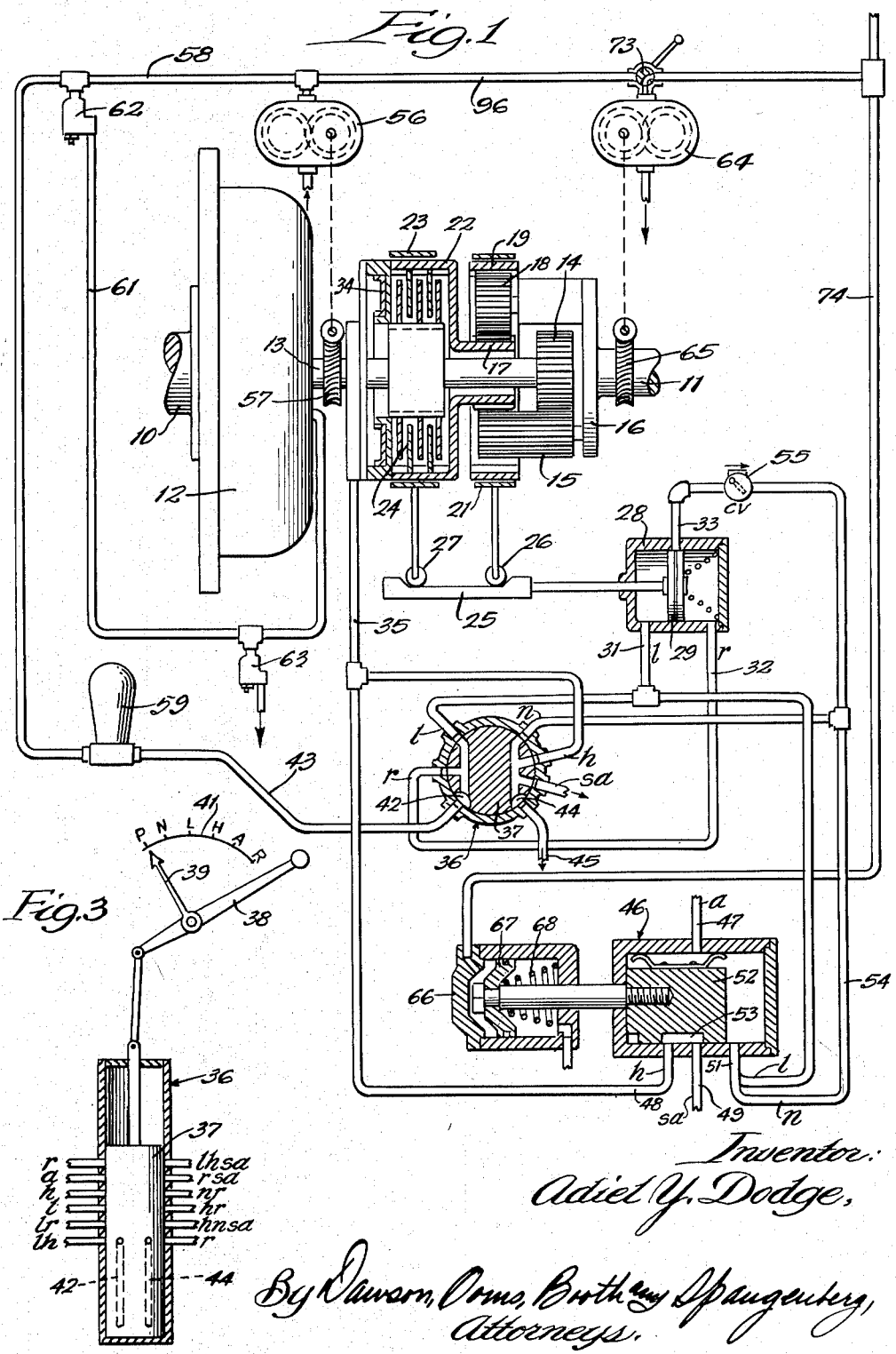

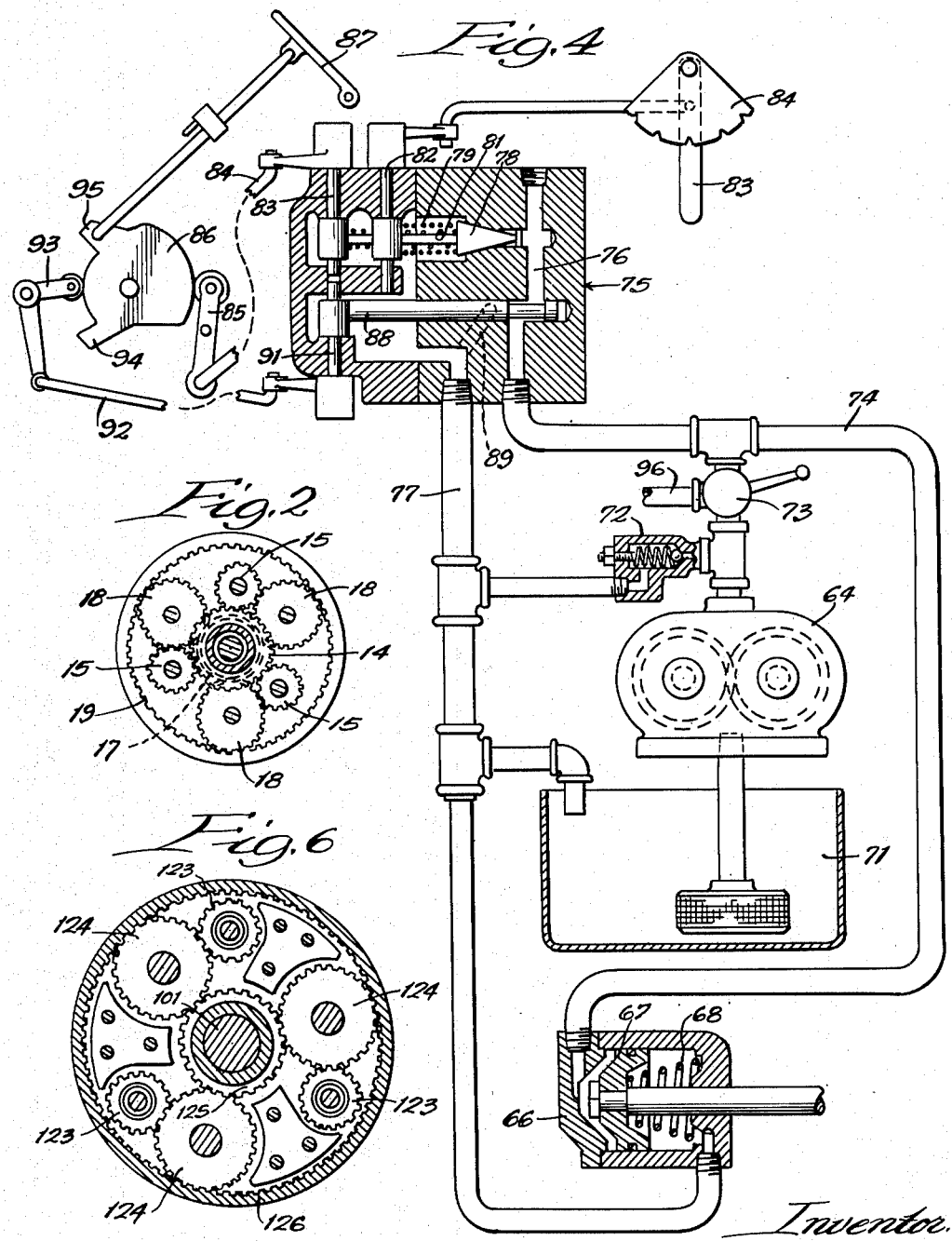

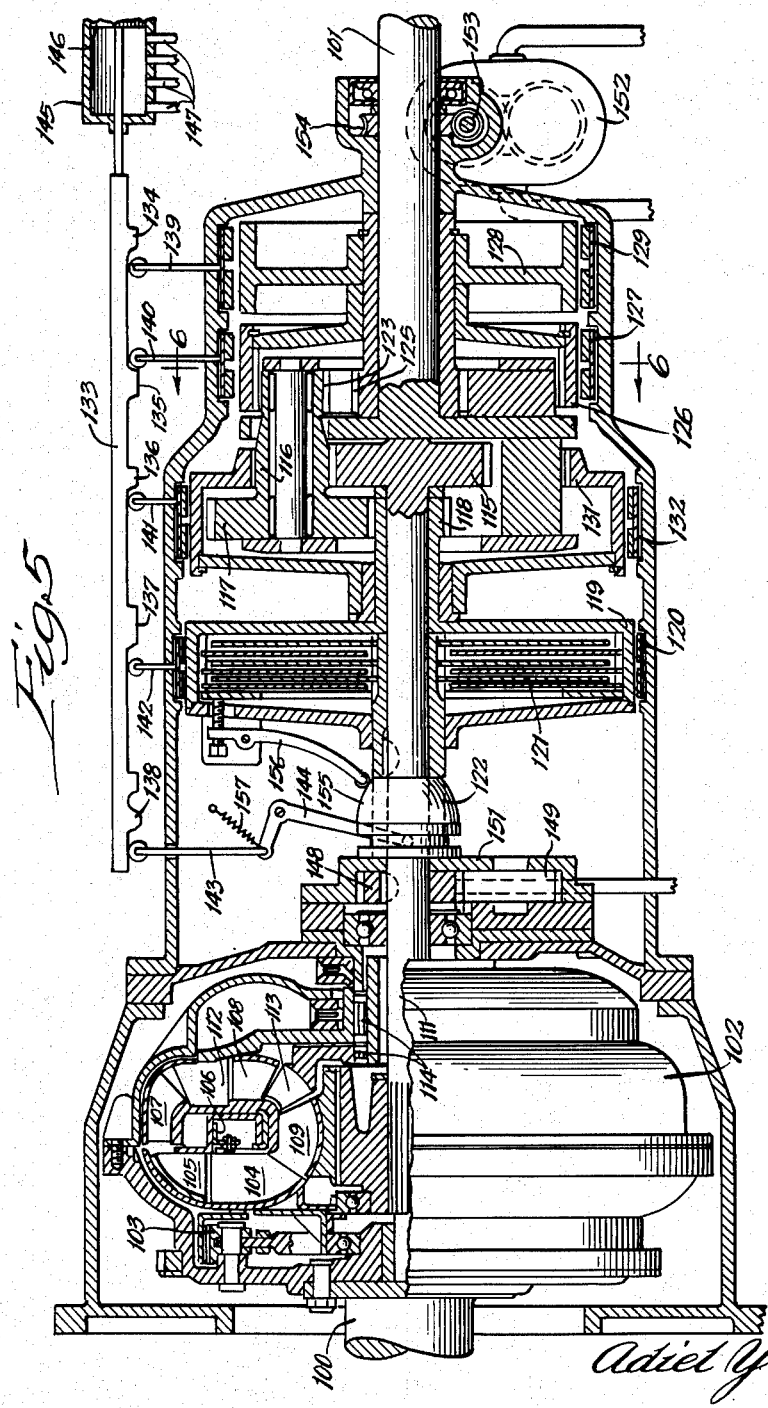

2,629,265

UNITED STATES PATENT OFFICE 2,629,265

TRANSMISSION

Adiel Y. Dodge, Rockford, Ill.

Application April 30, 1948, Serial No. 24,158

8 Claims. (Cl. 74—645)

This invention relates to transmissions and more particularly to variable speed and torque transmissions of the type adapted for use on automotive vehicles.

It has been proposed to employ various types of transmissions on automotive vehicles including transmissions utilizing hydraulic torque converters alone or in combination with variable gear sets. It has further been proposed to control such transmissions both manually to obtain any desired driving condition at will and automatically to change the driving condition in response to operation of the transmission. The present invention has for one of its objects the provision of a transmission of this type which can be controlled either automatically or manually at will.

Another object is to provide a transmission in which any one of a plurality of forward speed ranges and at least one reverse drive can be manually selected at will and in which changes from one to another forward driving condition can be automatically effected.

Still another object is to provide a transmission in which the ratio changes are produced by fluid pressure developed by operation of the transmission under the control of a manually operable valve. In the preferred construction the transmission operates a fluid pump to supply pressure for changing the transmission ratio and which may also supply operating fluid to a hydraulic torque converter forming a part of the transmission.

A further object is to provide a transmission in which the ratio changes are effected automatically in response to the pressure developed by a pump driven by the transmission output shaft. According to one feature of the invention, the same pump may be connected to the transmission control means to operate the same when the driven shaft is turning and the engine is stationary as, for example, in pushing the vehicle to start the engine.

A still further object is to provide a transmission in which a manually operable valve controls the change of gear ratios and also controls supply of operating fluid to an automatically operable valve so that the transmission may be operated manually or automatically at will.

The above and other objects and advantages of the invention will be more readily apparent when read in connection with the accompanying drawings, in which—

Figure 1 is a diagrammatic view of a transmission embodying the invention;

Figure 2 is a diagrammatic end view of the gear unit of the transmission of Figure 1 looking from the right in Figure 1 with parts omitted;

Figure 3 is a diagrammatic side elevation with parts in section illustrating the manual control valve of Figure 1;

Figure 4 is a diagrammatic view with parts in section of the automatic control mechanism;

Figure 5 is an axial section with parts in elevation of an alternative transmission construction; and Figure 6 is a partial section on the line 6—6 of Figure 5.

The transmission shown in Figure 1 is adapted to connect a driving shaft 10 to a driven or output shaft 11. The shaft 10 may be an engine crank shaft or an extension thereof, and the shaft 11 may be connected through the usual differential gearing to the driving wheels of a vehicle.

The transmission comprises a hydraulic torque converter indicated generally at 12 which may be any desired type of torque converter such as is shown, for example, in my Patent No. 2,270,515 or No. 2,287,374. This unit when properly filled with fluid serves to transmit the torque of the driving shaft 10 to an intermediate shaft 13 in infinitely varying speed and torque ratios between the maximum torque multiplication for which the unit is designed and a direct one to one drive. The intermediate shaft is connected to a compound planetary gear set which connects it to the driven shaft 11 and which is capable of providing a plurality of driving conditions including several forward driving ratios and one reverse ratio.

As shown, the planetary gear set comprises a sun gear 14 connected to the intermediate shaft and meshing with elongated planet pinions 15 rotatably mounted on a carrier 16 which is connected to the driven shaft 11. The pinions 15 extend beyond the sun gear 14 into register with a second sun gear 17 which is of such a size that it will not mesh with the pinions 15. Idler pinions 18 mesh with the sun gear 17 and with a ring gear 19 and with the planet pinions 15 as best seen in Figure 2. The ring gear 19 is adapted to be held stationary by a brake 21 for reverse drive, and the sun gear 17 is connected to a brake drum 22 adapted to be engaged by a brake 23 for low speed forward drive. A friction clutch mechanism indicated generally at 24 is provided to connect the intermediate shaft 13 directly to the drum 22. When the clutch is engaged the sun gears 14 and 17 will be connected so that the entire gear set will turn as a unit to provide direct drive.

The brakes 21 and 23 and the clutch 24 are controlled by fluid pressure mechanism to select the desired operating condition of the transmission. As shown, the brakes 21 and 23 are controlled by a movable cam bar having reversely facing cam surfaces to engage rollers 26 and 27 connected respectively to the brakes 21 and 23. When the cam bar is moved to the right, as seen in Figure 1, the brake 23 will be engaged, and when it is moved to the left, the brake 21 will be engaged. In the neutral position illustrated, both brakes are released.

The cam bar is shifted by a fluid pressure mechanism comprising a cylinder 28 having a piston 29 therein which is connected to the cam bar. The cylinder has end ports 31 and 32 and a center port 33 which may be supplied with pressure or connected to exhaust in order to effect the desired movements of the piston. The clutch 24 is operated by an annular piston 34 supplied with pressure through a pipe 35 so that when pressure is supplied to the piston 34 the clutch will be engaged.

Supply of pressure to the cylinder 28 and the piston 34 is controlled by a manual valve indicated generally at 36. The valve, as seen in Figure 3, comprises an outer cylinder formed with a plurality of vertically and circumferentially spaced ports controlled by a piston 37 slidable axially in the cylinder. The piston is adapted to be moved by a hand lever 38 which may be mounted on the steering column and which carries a pointer 39 movable over a dial indicated at 41 and which may be marked as shown.

The piston 37 of the valve is formed with an elongated inlet port 42 which is in constant communication with a pressure supply pipe 43 and with an elongated exhaust port 44 which is in constant communication with a discharge pipe 45 leading to a liquid sump. The elongated ports 42 and 44 are connected to cross ports arranged at different levels for selectively connecting the inlet and exhaust ports to a plurality of lateral ports in the valve casing which are in turn connected to the several operated units of the transmission. It will be understood that there may be a plurality of such connections at each level so that as the valve is moved axially in the valve casing the desired ones of the ports may be connected to a pressure source, others may be connected to the sump and still others may be closed.

The brakes and clutch are also adapted to be controlled automatically by an automatic valve indicated generally at 46 and which comprises a cylinder having a center inlet port 47 and a plurality of controllable ports 48, 49 and 51. A plunger 52 is slidable in the automatic valve cylinder and is provided with a passage 53 to connect the ports 48, 49 and 51, if desired. The plunger is adapted to be moved automatically in response to operating conditions of the transmission as will be described hereinafter.

The valve 36 is provided with a plurality of ports at different positions for operating the control mechanism to produce a low gear drive. These ports are indicated diagrammatically in both Figures 1 and 3 by the letter $l$. Similarly the valve is provided with a plurality of ports in different positions for producing a high ratio operation, all of such ports being indicated in Figures 1 and 3 by the letter $h$. The valve also has a series of neutral ports indicated in Figures 1 and 3 by the letter $n$ and a series of reverse ports indicated by the letter $r$. There is also an automatic port indicated by the letter $a$ and an automatic sump port indicated by the letters $sa$. It will be understood that where the same letter occurs at different levels in Figure 3 it indicates either a plurality of separate spaced ports which have a common pipe connection or interconnections through the valve plunger between the several ports having the same letter so that they are all interconnected in the valve plunger itself. Also where several different ports appear at the same level, they are circumferentially spaced as indicated in Figure 1 with passages in the valve plunger to provide the desired interconnections between the ports.

All of the neutral ports indicated at $n$ communicate with the pipe 33 at the center of the cylinder 28, as shown in Figure 1. The $l$ ports all communicate with the pipes 31 and 51, as shown in Figure 1; the $r$ ports all communicate with the pipe 32 at the right of the cylinder 28, as shown in Figure 1; and the $a$ port communicates with the pipe 47 to supply liquid to the automatic valve 46. In addition the port 51 is also connected through a pipe 54 and a check valve 55 to the pipe 33.

As the valve is operated to its several positions to move the indicator to the point P for park and N for neutral, L for low, H for high, A for automatic and R for reverse, the several ports in the valve will be either open to pressure as indicated by $p$ on the following chart, open to sump as indicated by $s$ on the following chart or closed as indicated by $c$ on the following chart.

|   | Ports in hand valve | | | | | | Ports in automatic valve | | | |
|---|---|---|---|---|---|---|---|---|---|---|
|   | $n$ | $l$ | $h$ | $a$ | $r$ | $sa$ | $a$ | $l$ and $n$ | $h$ | $sa$ |
| P | $c$ | $p$ | $p$ | $c$ | $s$ | $c$ | $s$ | $c$ | $c$ | $c$ |
| N | $s$ | $p$ | $s$ | $c$ | $p$ | $s$ | $s$ | $c$ | $s$ | $s$ |
| L | $c$ | $p$ | $s$ | $c$ | $s$ | $c$ | $s$ | $c$ | $c$ | $c$ |
| H | $s$ | $s$ | $p$ | $c$ | $s$ | $c$ | $s$ | $c$ | $c$ | $c$ |
| A | $c$ | $c$ | $c$ | $p$ | $s$ | $s$ | $p$ | Auto | Auto | $s$ |
| R | $c$ | $s$ | $s$ | $c$ | $p$ | $s$ | $s$ | $s$ | $s$ | $s$ |

$p$ = open to pressure.
$s$ = open to sump.
$c$ = closed.

Thus in the parking position fluid is admitted to the left of the cylinder 28 and to the piston 34 to engage both the clutch 24 and the brake 23 so that the sun gear 17 is locked to the intermediate shaft 13 and both are held stationary. Thus at this time the vehicle is held against any movement. In neutral the parts will be in the position shown with both brakes 21 and 23 disengaged and the clutch 24 disengaged so that no torque can be transmitted through the gearing. For low the port $n$ is closed and pressure is admitted to the port $l$ to move the piston 29 to the right thereby engaging the brake 23 to hold the sun gear 17 stationary. At this time the sun gear 14 drives through the planet and idler pinions which later roll around the stationary sun gear 17 to turn the driven shaft forward at reduced speed. In the high position both brakes 21 and 23 are released, and the clutch 24 is engaged so that the engine drives directly through the torque converter and the locked gear unit to the driven shaft. In automatic the port $a$ is connected to a source of fluid under pressure through the manual valve so that when the valve 52 moves it will automatically control the brake 23 and the clutch 24. In the position of valve 52 shown fluid will be supplied through the automatic valve to the left end of the cylinder 28 to engage the low speed brake 23, the pipe 35 being connected to sump through the port 48, the valve passage 53 and the port 49 which is connected to the sa passage in the valve. As the valve plunger 52 moves to the right the port 51 will be connected to the sump through port 49 and fluid will be supplied to the piston 34 through the port 48 to engage the clutch for high gear operation. While the position of automatic valve 52 shown is indicative of the low position, the transmission remains in the parked position because no fluid is delivered to a or port 47 while valve 37 is in the position shown.

For reverse fluid is supplied through the passage 42 and port 32 to the right side of the cylinder 28 to move the piston 29 to the left and engage the brake 21. At this time the idler pinions 18 will roll around on the stationary ring gear 19 to cause the carrier and the driven shaft to turn in reverse.

To supply fluid for operating the clutches and brakes as described, a primary fluid pump 56 is provided driven by a gear 57 on the intermediate shaft 13. The pump 56 receives fluid from a sump, not shown, and pumps it into a distributing line 58 which leads through the accumulator 59 to the pressure supply port in the valve which communicates with the elongated port 42. Preferably a bypass connection 61 is provided connected to the pipe 58 through a pressure responsive valve 62 to supply operating liquid to the torque converter 12. After a predetermined pressure has built up in the accumulator 59, the valve 62 will open to circulate liquid through the torque converter thereby to maintain it full and to produce a cooling effect. Preferably a pressure responsive relief valve 63 is provided discharging to the sump to prevent building up an undesirably high pressure in the torque converter.

Automatic control of the transmission to shift the valve plunger 52 of Figure 1 is preferably produced in response to a fluid pressure which is in turn responsive to rotation of the driven shaft 11. As shown, a gear pump 64 is driven by a gear 65 on the shaft 11 and supplies pressure to a cylinder 66 under the control of an automatic valve mechanism. The cylinder 66 contains a piston 67 urged to the left by a spring 68 and connected directly to the valve plunger 52 to move it. The pressure developed in the cylinder 66 is controlled by a control mechanism 75, as shown in Figure 4, which is substantially similar to that more particularly described and claimed in my Patent No. 2,372,817.

As shown in Figure 4, the pump 64 receives liquid from a sump indicated generally at 71 and discharges past an overload relief valve 72 and a transfer valve 73 whose purpose will be described hereinafter into a pipe 74 leading to the left end of the cylinder 66. The pipe 74 also connects to a valve unit indicated generally at 75 by means of which the pressure acting on the piston 67 is regulated. The valve unit comprises an elongated passage 76 communicating with the pipe 74 and having a return passage 77 leading therefrom to the sump. Communication from the passage 76 to the sump is controlled primarily by a pressure relief valve 78 which is normally urged toward its closed position by a pair of springs 79 and 81. The spring 79 seats against the end of a lever connected to a shaft 82 which is manually adjustable through a handle 83 movable over a segment 84 to control the point at which the transmission will shift from low to high thereby to alter its automatic performance characteristics. The spring 81 similarly seats against the end of a lever on a shaft 83 which is connected through a link 84 to a follower lever 85 engaging a cam 86 operated by the usual accelerator pedal 87. The cam 86 is circular throughout substantially one-fourth of its periphery but drops off toward one end so that the follower will relieve the pressure on the spring 81 when the accelerator pedal is moved to its substantially wide open position.

In operation the output pressure of the pump 64 will be more or less relieved by the valve 75 so that the piston 67 will not be moved to the right until a relatively high speed is reached. By adjusting the spring loading on the valve through the lever 83 and through the cam mechanism on the accelerator pedal, the speed at which the shift will occur can be changed, the greater the spring loading the lower the speed at which the shift takes place.

Under certain driving conditions, it may be desired to quickly manually shift the transmission into low speed drive. This may be done by depressing the accelerator pedal all the way down below the full open throttle position. So doing will prevent supply of pressure to the cylinder 66. For this purpose a slide valve 88 is arranged in the valve body to control communication between the passage 76 and a bleed passage 89. The valve 88 is controlled through a shaft 91 which is connected by a link 92 to a bell crank 93 adjacent the cam 86. The cam is provided with a pair of projecting ears 94 and 95 movable in a path to engage the end of the bell crank 93. When the accelerator pedal is fully depressed, the ear 95 will engage the bell crank 93 and shift the valve 88 to the left to open the passage 76 directly to the bleed passage 89. At this time no pressure can be built up in the cylinder 66 so that the transmission will return to low gear. To return to normal automatic operation, it is necessary only to release the accelerator pedal so that the ear 94 will rock the bell crank lever 93 to the position shown to close the valve 88. At this time pressure in the cylinder 66 is controlled automatically by the valve 78 as described above.

In order that the engine may be started by pushing the car, the transfer valve 73 is provided which normally occupies the position shown in Figure 1 to connect the pump 64 to the pipe 74. When the transfer valve is turned 90° clockwise, it will connect the pump 64 through a pipe 96 to the pipe 58 so that fluid supplied by the pump 64 can be utilized to operate the brakes and the clutch so that the transmission will transmit torque. This enables the engine to be started by pushing the vehicle when the control handle is placed in either the low or high position.

With the transmission and control mechanism as described, the operator can select any ratio in which he wishes to operate simply by moving the control lever 38 to the desired position so that complete manual selectivity is provided at all times. For automatic operation the control lever is moved to the automatic position which will initially place the transmission in its low range condition. As the driven shaft speed increases, the transmission will automatically shift to its high range position and can automatically change between low and high as operating conditions demand. It is noted, however, that at any time the operator can overrule the automatic operation by shifting to a desired selected position at which time the automatic control mechanism is made ineffective by cutting off the supply of operating fluid to the automatic valve.

The clutch 24 shown in Figure 1 might be changed to a mechanically actuated over center clutch more like clutch 121 shown in Figure 5. Such change will make a mechanically locked low and high gear in the parking position.

Figures 5 and 6 illustrate an alternative transmission arrangement adapted to be controlled either manually or automatically in the same manner as the transmission of Figures 1 to 4 by similar control mechanism. The transmission of Figures 5 and 6 is adapted to connect a driving shaft 100 to a driven shaft 101 and comprises a hydraulic torque converter indicated generally at 102 connected to the driving shaft. The torque converter is shown as being of the type more particularly described and claimed in my Patent No. 2,421,190 and comprises a speed responsive friction clutch 103 connected to the driving shaft 10 and adapted to connect it to an impeller 104 in the torque converter. The impeller carries a set of fixed vanes and a set of auxiliary vanes 105 which are normally rotatable relative to the impeller structure and are connected thereto a predetermined speed by a speed responsive clutch 106. The torque converter includes a double rotor having spaced sets of vanes 107, 108 and 109 which are connected to an intermediate shaft 111. Sets of stator vanes 112 and 113 are arranged between the spaced sets of rotor vanes and are normally held against reverse rotation by one-way brakes 114. While one particular type of torque converter has been shown and described, it will be understood that torque converters of other types could be employed, if desired.

The intermediate shaft 111 drives a compound planetary gear set which is shown as being identical with a gear set more particularly described and claimed in my copending application Serial No. 660,232, filed April 6, 1946, now Patent No. 2,570,327 of which this application is a continuation in part. In this gear set a first sun gear 115 is connected to the intermediate shaft 111 and meshes with compound planet pinions having central portions 116 meshing with the sun gear 115. The pinions include larger portions 117 meshing with a second sun gear 118 which is connected to a brake drum 119. The brake drum can be held stationary by a brake 120 or can be connected to the intermediate shaft 111 by a friction clutch 121 operated by a collar 122. The pinions include a third reduced portion 123 meshing with idler pinions 124 as best seen in Figure 6. The idler pinions mesh in turn with a third sun gear 125 and with a ring gear 126. The ring gear can be held stationary when desired by a brake 127, and the sun gear 125 is connected to a brake drum 128 which can be held stationary by a brake 129. The pinion portions 116 mesh with a ring gear 131 which can be held stationary by a brake 132.

The several brakes and clutches may be controlled by one or more cam bars 133 having spaced cam projections 134, 135, 136, 137 and 138 thereon. The projection 134 may cooperate with an operating rod 139 for the brake 129, the projection 135 cooperates with an operating rod 140 for the brake 27, the projection 136 cooperates with an operating rod 141 for the brake 132 and the projection 137 cooperates with an operating rod 142 for the brake 120. The projection 138 moves an operating rod 143 which is connected through a bell crank 144 to the clutch operating collar 122 to control the clutch 121. The cam bar 133 may be moved to operate the several operating rods through one or more fluid motors each of which includes a cylinder 145 having a piston 146 therein which may be controlled similarly to the piston 29 of Figure 1 to move to any one of a plurality of positions by ports 147.

The parts as shown are in the neutral position with all of the brakes and the clutch disengaged so that no torque can be transmitted through the gear set. For low gear drive the cam rod 133 is shifted one step to the left to engage the clutch and hold the ring gear 131 stationary. At this time the sun gear drives through the pinion portions 116 to cause them to roll around the ring gear at low speed to drive the gear carrier and the driven shaft forward at low speed. For second speed the cam rod is shifted further to the left to disengage the brake 132 and engage the brake 129. At this time the sun gear 125 is held stationary so that the idler pinions 124 can roll around it. The idler pinions are driven through the compound planet pinions 123 from the sun gear 115 and will turn the gear carrier forward at a small speed ratio. For direct forward drive the cam bar is shifted still further to the left to disengage the brake 129 and engage the clutch 121. At this time the gear set is locked to turn as a unit so that the intermediate shaft is connected directly to the driven shaft. For overdrive the cam bar is shifted still further to the left to disengage the clutch 121 and engage the brake 120. At this time the sun gear 118 is held stationary, and the relatively large planet pinions 117 will roll around it to drive the gear carrier forward at a higher speed than the intermediate shaft. For reverse the cam bar is shifted to the right to engage the brake 127 and hold the ring gear 126 stationary. At this time the idler pinions 124 will roll around the stationary ring gear to turn the gear carrier in a reverse direction.

The intermediate shaft 111 drives a pump corresponding to the pump 56 of Figure 1 and shown as including a pinion 148 keyed to the intermediate shaft and meshing with a second pinion 149. The pinions are enclosed by a housing 151 so that they form a gear pump to supply fluid to the control system as described in connection with Figures 1 to 4.

Similarly the driven shaft 101 drives a pump 152 through a worm 153 and worm gear 154. The pump 152 corresponds to the pump 64 of Figures 1 to 4 and may function in the same manner to provide automatic operation and to supply operating fluid for the clutches and brakes to start the vehicle engine by pushing the vehicle.

The clutch 121 is preferably operated by a mechanical over-center mechanism so that once it is engaged it will be held engaged until it is positively released. For this purpose the collar 122 is formed with an annular cam surface 155 which engages the lower end of a clutch operating lever 156. When the collar 122 is shifted to the right it will cam the lever 156 clockwise to engage the clutch 121 and the cam angle is such that pressure on the lever 156 does not tend to urge the collar 122 back to the left. Therefore the parts will remain in this position until the collar is shifted to the left. This is accomplished by a spring 157 connected to the lever 144 when the cam bar 133 is shifted to a position to disengage the projection 138 from the rod 143.

This arrangement is particularly useful in parking since it maintains the clutch engaged even though the vehicle should be parked long enough to lose the normal operating pressure for the clutch. It will be apparent that a similar operating arrangement could be provided for the several brakes to insure that they will be held engaged even though the fluid pressure is lost.

While several embodiments of the invention have been shown and described in detail herein, it will be understood that these are illustrative only and are not to be taken as a definition of the scope of the invention, reference being had for this purpose to the appended claims.

What is claimed is:

1. A transmission for connecting a driving member to a driven shaft comprising a hydraulic torque converter connected to the driving shaft, an intermediate shaft driven by the torque converter, a variable speed gear set connecting the intermediate shaft to the driven member, controllable elements in the gear set to change the gear ratio thereof, fluid pressure operated means to control the controllable elements, a pump driven by one of the shafts, a manually operable valve connecting the pump to the pressure operated means and controllable to operate said elements selectively to select any desired gear ratio of the gear set at will, a second pump driven by the driven member, automatic means responsive to the pressure developed by the second pump and connected to the fluid pressure operated means to control the controllable elements, a connection from the manually operable valve to the automatic means to supply operating fluid to the automatic means and means in said manually operable valve to open or close said connection to make the automatic means operative or inoperative at will.

2. A transmission for connecting a driving shaft to a driven member comprising a hydraulic torque converter connected to the driving shaft, an intermediate shaft driven by the torque converter, a variable speed gear set connecting the intermediate shaft to the driven member, controllable elements in the gear set to change the gear ratio thereof, fluid pressure operated means to control the controllable elements, a pump driven by one of the shafts, a manually operable valve connecting the pump to the pressure operated means and controllable to operate said elements selectively to select any desired gear ratio of the gear set at will, a second pump driven by the driven member, automatic means responsive to the pressure developed by the second pump and connected to the fluid pressure operated means to control the controllable elements, a connection from the manually operable valve to the automatic means to supply operating fluid to the automatic means, means in said manually operable valve to open or close said connection to make the automatic means operative or inoperative at will, and a connection from the second pump to the manually operable valve to supply fluid thereto when the driven shaft is turning.

3. A transmission for connecting a driving shaft to a driven member comprising a hydraulic torque converter connected to the driving shaft, an intermediate shaft driven by the torque converter, a variable speed gear set connecting the intermediate shaft to the driven member, controllable elements in the gear set to change the gear ratio thereof, fluid pressure operated means to control the controllable elements, a pump driven by one of the shafts, a manually operable valve connecting the pump to the pressure operated means and controllable to operate said elements selectively to select any desired gear ratio of the gear set at will, a second pump driven by the driven member, automatic means responsive to the pressure developed by the second pump and connected to the fluid pressure operated means to control the controllable elements, a connection from the manually operable valve to the automatic means to supply operating fluid to the automatic means, means in said manually operable valve to open or close said connection to make the automatic means operative or inoperative at will, and connections from the pumps to the torque converter to supply operating fluid thereto.

4. A transmission for connecting a driving shaft to a driven shaft comprising a hydraulic torque converter connected to the driving shaft, an intermediate shaft driven by the torque converter, a compound differential gear set including a plurality of relatively rotatable elements one of which is connected to the intermediate shaft and another of which is connected to the driven shaft, brakes for selectively holding others of the elements against rotation to produce different gear ratios, a clutch to connect the intermediate shaft to an element of the gear set other than said one element to lock the gear set for direct drive therethrough, fluid pressure operated means to control the brakes and clutch, a manually operable valve to control the supply of fluid pressure selectively to any one of the pressure operated means thereby to select a desired gear ratio of the transmission at will, a fluid pump driven by the driven shaft, a valve operable automatically in response to the pressure developed by the pump to control the supply of fluid pressure to the pressure operated means, means in the manually operable valve to make the last named valve effective or ineffective at will, and means independent of the last named valve to connect the fluid pump to the pressure operated means to supply fluid pressure thereto.

5. In a transmission, a differential gear set including a plurality of relatively rotatable elements, means for connecting one of the elements to a driving shaft and a second to a driven shaft, a friction brake engageable with a third element to hold it stationary, a friction clutch to connect two elements of the gear set, and operating means for the brake and clutch simultaneously to engage them, at least one of the operating means including a shiftable cam and a follower engaging the cam to move the connected brake or clutch to its engaged position when the cam is in one position, the cam being so shaped that pressure of the follower thereon acts substantially perpendicular to its surface when it is in said one position.

6. A transmission for connecting a driving shaft to a driven member comprising a hydraulic torque converter connected to the driving shaft, an intermediate shaft driven by the torque converter, a variable speed gear set connecting the intermediate shaft to the driven member, controllable elements in the gear set to change the driving condition thereof, fluid pressure operated means to control the controllable elements, a pump driven by one of the shafts, a manually operable valve movable to a plurality of positions, connections through the valve in certain of the positions to the controllable elements to operate said elements selectively to select any desired condition of the gear set at will, a second pump driven by the driven member, a second valve connected to certain of the controllable elements to supply fluid thereto to operate them, means responsive to the pressure developed by the second pump to control the second valve, and a connection from the first named valve in one of its positions to supply fluid to the second valve.

7. A transmission for connecting a driving shaft to a driven member comprising a hydraulic torque converter connected to the driving shaft, an intermediate shaft driven by the torque converter, a variable speed gear set connecting the intermediate shaft to the driven member, controllable elements in the gear set to change the driving condition thereof, fluid pressure operated means to control the controllable elements, a pump driven by one of the shafts, a manually operable valve movable to a plurality of positions, connections through the valve in certain of the positions to the controllable elements to operate said elements selectively to select any desired condition of the gear set at will, a second pump driven by the driven member, a second valve connected to certain of the controllable elements to supply fluid thereto to operate them, means responsive to the pressure developed by the second pump to control the second valve, an engine control member, and a valve operated by the engine control member in an extreme position thereof to vent the pressure on the pressure responsive means.

8. In a transmission, a differential gear set including a plurality of relatively rotatable elements, means for connecting one of the elements to a driving shaft and a second to a driven shaft, a friction brake engageable with a third element to hold it stationary, a friction clutch to connect two elements of the gear set, operating means for the brake and clutch including at least one fluid motor movable in response to fluid pressure, control means for the motor to cause it to move the operating means to a position to effect simultaneous engagement of the brake and clutch, and a mechanical holding mechanism in at least one of the operating means to hold it in its engaged position regardless of removal of the operating force by loss of pressure in the fluid motor.

ADIEL Y. DODGE.

REFERENCES CITED

The following references are of record in the file of this patent:

UNITED STATES PATENTS

| Number | Name | Date |
|---|---|---|
| 694,197 | Rose | Feb. 25, 1902 |
| 716,929 | Ough | Dec. 30, 1902 |
| 1,307,320 | Von Zweibergk | June 17, 1919 |
| 2,055,303 | Patterson | Sept. 22, 1936 |
| 2,072,379 | Patterson | Mar. 2, 1937 |
| 2,077,580 | Patterson | Apr. 20, 1937 |
| 2,185,538 | Burtnett | Jan. 2, 1940 |
| 2,194,954 | Ravigneaux | Mar. 26, 1940 |
| 2,195,783 | Ravigneaux | Apr. 2, 1940 |
| 2,223,716 | Bojesen | Dec. 3, 1940 |
| 2,272,934 | Cotal | Feb. 10, 1942 |
| 2,314,554 | Pennington | Mar. 23, 1943 |
| 2,329,724 | Maurer | Sept. 21, 1943 |
| 2,332,593 | Nutt et al. | Oct. 26, 1943 |
| 2,372,817 | Dodge | Apr. 3, 1945 |
| 2,374,303 | Osborne | Apr. 24, 1945 |
| 2,407,289 | La Brie | Sept. 10, 1946 |
| 2,428,982 | Miller et al. | Oct. 14, 1947 |
| 2,466,244 | Kelbel | Apr. 5, 1949 |
| 2,516,203 | Greenlee et al. | July 25, 1950 |
| 2,548,208 | Evernden | Apr. 10, 1951 |
| 2,564,466 | Clifton | Aug. 14, 1951 |
| 2,575,522 | McFarland | Nov. 20, 1951 |

FOREIGN PATENTS

| Number | Country | Date |
|---|---|---|
| 375,254 | Italy | Sept. 29, 1939 |